Dec. 12, 1961     T. HARRIS     3,012,689
CONTAINERS

Filed Jan. 19, 1960     2 Sheets-Sheet 1

INVENTOR.
THOMAS HARRIS
BY Ely, Pearne
& Gordon
ATTORNEYS

Dec. 12, 1961 T. HARRIS 3,012,689
CONTAINERS
Filed Jan. 19, 1960 2 Sheets-Sheet 2

INVENTOR.
THOMAS HARRIS
BY Ely, Pearne
& Gordon
ATTORNEYS

United States Patent Office 3,012,689
Patented Dec. 12, 1961

3,012,689
CONTAINERS
Thomas Harris, Gates Mills, Ohio, assignor to Structural Fibers, Inc., Chardon, Ohio, a corporation of Ohio
Filed Jan. 19, 1960, Ser. No. 3,408
5 Claims. (Cl. 220—5)

This invention relates generally to containers, and, more specifically, to a uniquely assembled container formed from a fiber-reinforced, resinous material. As will hereinafter become more apparent, a container constructed according to my invention is particularly well adapted to the handling of fluids, and in particular to the handling of corrosive chemicals.

The invention has for its principal objective the provision of a uniquely constructed, non-metallic container which is leakproof, resistant to corrosive attack by liquid chemicals and the like, and which has a high strength-to-weight ratio.

Other objects of the invention are the provision of a non-metallic container which is rugged, durable and inexpensive to manufacture.

The foregoing objectives are achieved by assembling the container from preformed wall sections of a fiber-reinforced, molded resin material in such a manner that a double thickness of material is provided along the side edge joints of the container sections. The overlapping arrangement of the side edges container sections serves the dual purpose of strengthening the container at the inherently weakest points of the individual sections, and providing a fluid-tight joint so that fluid in the container is prevented from leaking between the contiguous edges of the assembled sections.

The material itself is light in weight, resistant to corrosive attack, and also possesses high strength and rigidity for its weight. Because of the novel assembly of the sections, combined with the inherent properties of the resinous material, a container constructed according to my invention is rugged and durable, and yet has a high strength-to-weight ratio. As a result, the container can be handled in a facile manner while being moved and stored, and is inexpensive to ship.

With specific regard to the storage and handling of fluid chemicals, heretofore it has been common practice to use drums made of stainless steel for this purpose. Such containers possess several disadvantages, the most obvious one being their high cost. Additionally, stainless steel containers which have the required strength and rigidity are relatively heavy and thus are expensive to ship and difficult to handle.

In accordance with the invention, these and other disadvantages of the prior art are overcome by constructing the container from a plurality of lightweight, molded resin sections which are designed so that they may be inexpensively manufactured, and which when assembled produce a container having the desired strength and rigidity and minimum weight.

Other objects and attendant advantages of the invention will become apparent as the same becomes better understood when considered in connection with the following detailed description and accompanying drawings wherein.

Figure 1:
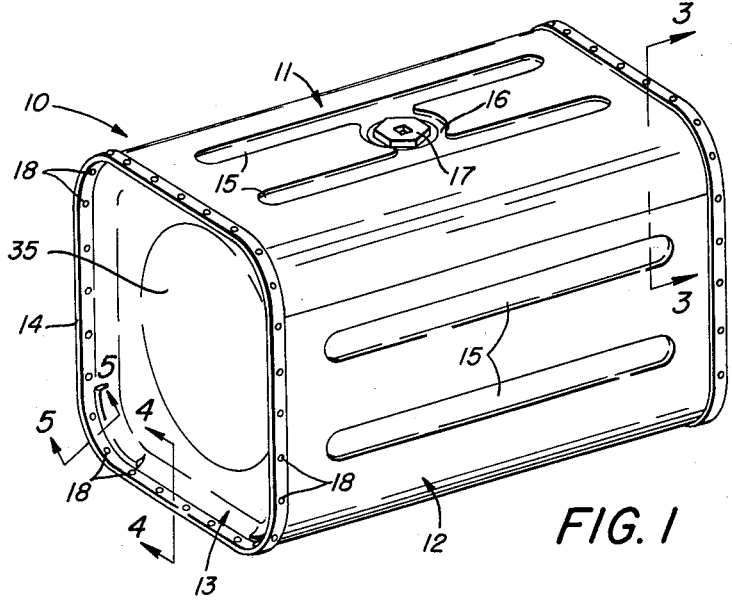
FIGURE 1 is an isometric view of an assembled container constructed according to my invention.

Referring now to the drawings, reference numeral 10 generally designates a container constructed according to my invention. The container comprises a top wall section 11, opposed side wall sections 12 (only one being shown), a bottom wall section (not shown) and opposed end panels 13. While the illustrated embodiment has been shown in the form of a rectangular parallelepiped, it will be evident from the following detailed description that the invention is not limited to such a configuration, but may take the form of a container having any number of mutually attached wall sections.

In the preferred embodiment, the side wall sections and top wall section are shaped to include longitudinally extending rib-like depressions 15 which serve to stiffen and strengthen the individual sections. Preferably, the bottom wall section and side wall sections are identical in shape so that they can be formed in the same dies or molds. In addition to the rib-like depressions 15, the top wall section includes a depression 16 in which is located a threaded plug 17 affording communication to the interior of the container, the top of the plug being located either below or flush with the outer surface of the top wall section so that the containers can be stacked one on top of another.

Each wall section of the container is separately preformed to its desired shape, the several sections and end panels being assembled in a unique overlapping relationship to form fluid-tight joints along the side edges of the container. The side, top and bottom wall sections are held in their assembled position by a suitable cement applied to the overlapping surfaces, while a metal binding and reinforcing strip 14, as well as cement, may be used in conjunction with rivets 18 to assemble the end panels 13 to the ends of the top, bottom and side wall sections.

Figure 2:
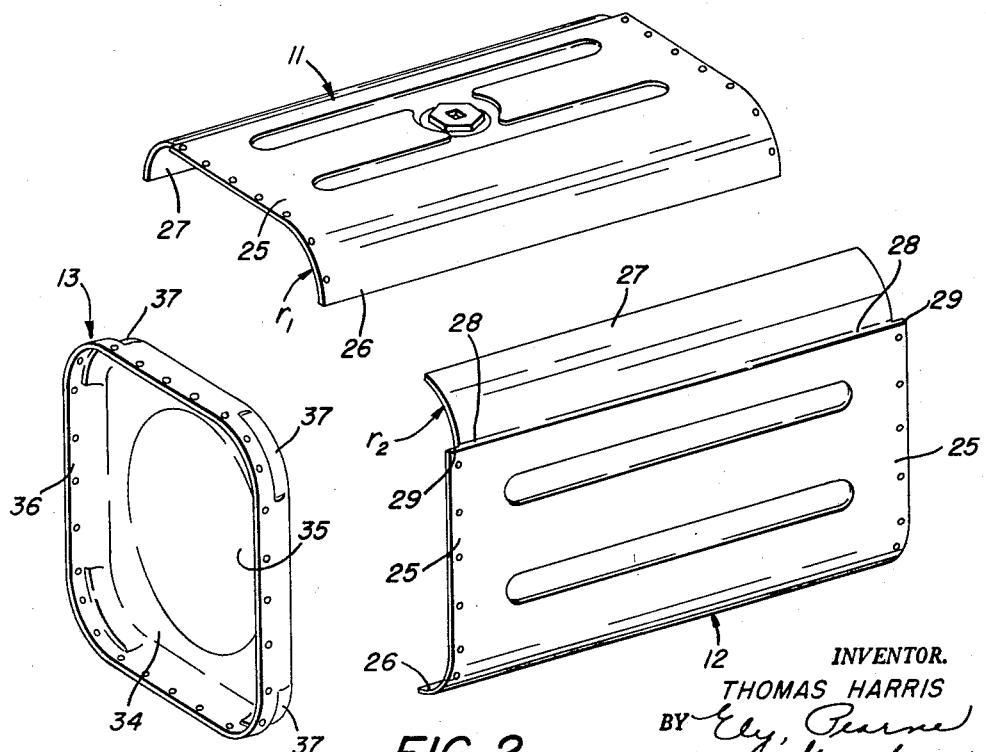
FIGURE 2 is an exploded isometric view of a portion of the container.

As shown most clearly in FIG. 2, the side wall sections 12 and the top wall section 11, as well as the bottom wall section, comprise generally rectangular body portions 25. These body portions have coextensive curved side edges 26 which form the rounded side edges of the container, and which have a radius of curvature $r_1$. Opposite the curved side edge 26 of each wall section is a curved lip 27 having a slightly smaller radius of curvature $r_2$ than the radius $r_1$ of the curved side edge 26 and extending transversely to its body portion in the same general direction. Each lip 27 is inwardly offset from the body portion of its section by an amount substantially equal to the thickness of the material of construction to form a shoulder 28, and has its ends terminating short of the ends of its body portion and curved side edge to form end flanges 29 on the body portion and the curved side edge.

Each end panel 13 comprises a substantially flat and rectangular wall portion 34 having an outwardly projecting bulge or center dome 35, and a continuous, outwardly extending peripheral rim 36 having rounded corners. The rounded corners of the rim have a radius of curvature substantially equal to the radius $r_2$ of the curved lips 27 and include inwardly and downwardly stepped surfaces 37 formed in the outer side surfaces of the corners. The depth of these steps is substantially equal to the thickness of the material of the lips 27, while the circumferential length of the stepped surfaces substantially equals the curved width of these lips.

Figure 3:
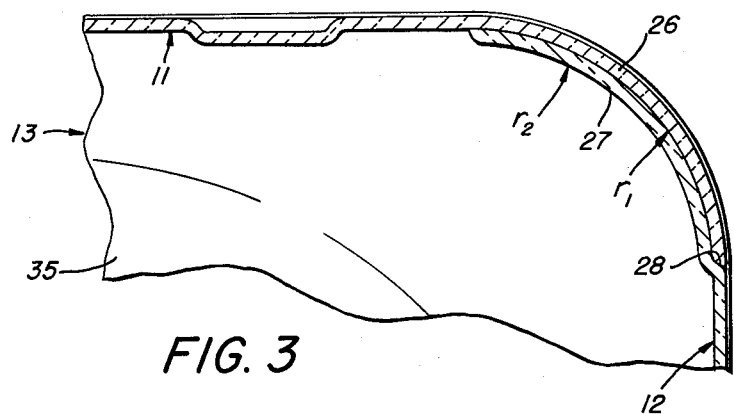
FIGURE 3 is a fragmentary, vertical sectional view taken along the line 3—3 of FIG. 1.

In assembling the container, the top, side, and bottom wall sections are interfitted with one another so that the curved side edge 26 of each overlies the lip 27 of another and is in engagement with the shoulder 28 thereof as indicated most clearly in FIG. 3. The sections are held in the assembled position by a suitable adhesive which is applied between the outer surface of the lips and the inner surface of the curved side edges 26. Because the lips 27 are offset from the body portion by an amount substantially equal to the thickness of the material, the edges 26 will merge into coplanar relationship with body portion of the adjacent section. The resulting smooth, continuous outer surface of the assembled container not only presents a neat appearance, but at the same time permits the assembled container to be smoothly slid on another without interference from protruding edges. More significantly, the two-ply thickness of material at the inherently weak side edges greatly enhances the rigidity and other strength characteristics of the container, and yet does not appreciably increase its weight. In addition, the overlapping arrangement of the lips and curved side edges provides leakproof joints between the assembled top, bottom and side wall sections.

Figure 4:
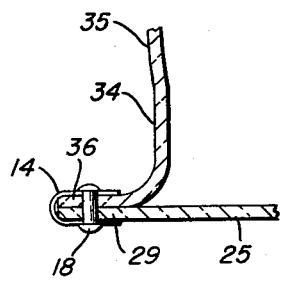
FIGURE 4 is a fragmentary, sectional view taken along the line 4—4 of FIG. 1.
Figure 5:
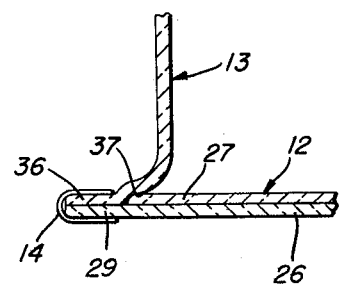
FIGURE 5 is a fragmentary, sectional view taken along the line 5—5 of FIG. 1.

When the top, bottom and side wall sections have been assembled, the end panels are fitted into position as shown in FIGS. 4 and 5 with the end portions of the lips 27 nesting against the stepped surfaces 37, and with the flanges 29 overlapping the rims 36 and lying flush with the outer ends of the rims 36 entirely around the container. A fluid-tight seal between the end panels and the assembled side, top and bottom wall sections is achieved by wrapping a metal strip 14 around rims 36 of the end panels and the flanges 29 of the four adjoining sections, and by using a suitable adhesive between the rims 36 and the flanges 29. This metal strip, which may be made from stainless steel in the event the containers are to be exposed to corrosive chemical fumes, serves the additional function of preventing the ends of the container from being abraded when dragged along rough concrete floors or the like, and from being otherwise damaged during handling and shipment of the container.

According to the invention, the container preferably is formed from a relatively thin, compressed sheet of matted fibers made of glass, plastic, or the like, impregnated and coated with a thermosetting resin, or similar material, which is set to a hard, infusible condition by procedures well known in the art. The thickness of the material may be of the order of ⅛ inch for sections which are 2 to 3 feet in their maximum dimension. It is obvious, however, that the dimensional relationships can be varied to suit the required strength and rigidity of the assembled container. If the material is made of matted fibers impregnated and coated with conventional polyester resin, the cement used to secure the sections and end panels together may be any one of the well known thermosetting epoxy resin cements, the cement being applied to the overlapping portions before assembly. After application of the cement and assembly, the sections and panels are clamped together by suitable clamps and exposed to heat to set the cement. This procedure is effective to produce a container having an extremely high strength-to-weight ratio, and which is several times lighter than a metal container having the same strength characteristics.

It will be appreciated from the above description that a unique and important feature of my invention is the manner in which the container is assembled from separate, preformed wall sections. This feature results in several distinct advantages which are emphasized for a better appreciation of the invention. Initially, the container can be more efficiently manufactured in sections, both from the standpoint of economy and strength considerations. It will be observed that none of the sections is of appreciable depth, and, hence, it can be molded without drawing out the material to inadequate thicknesses such as would weaken the section. Moreover, the individual, shallow sections can be molded in identical or substantially identical molds thereby reducing the cost of manufacture.

The overlapping arrangement of the curved side edges 26 and the lips 27 serve a two-fold purpose of strengthening the side edge joints of the container by producing a double thickness of material at these points, such a construction being obviously much stronger than a one-piece molded container having a constant wall thickness. Secondly, the overlapping arrangement produces fluid-tight joints which renders the container capable of containing fluids without the possibility of leakage through the side edge joints of the container sections. The arrangement in which the ends of the lips 27 are received in the stepped recesses of the end panels also significantly contributes to the fluid seal by preventing fluid in the container from leaking from mating points of the corner edges of contiguous sections and the end panels.

Another important feature is the composition of the material of the uniquely assembled container. While the construction of containers from fiber reinforced resinous materials is not of itself new, the novel arrangement and assembly of container sections made from this material produces several new and unexpected results. Not only does the overlapping arrangement of the side edges of the sections result in a container which is much stronger than a one-piece molded container, but it results in a container which has a larger strength-to-weight ratio than the metals which have been heretofore used in similar applications. Because of its light weight, the container can be more easily handled and carried before and after it has been filled, and also it is relatively inexpensive to ship. The material itself is resistant to corrosive attack by chemicals contained within the container, and to attack by chemical fumes to which the container may be exposed in a factory. Additionally, the end edges of the container are protected from gouging and abrasion, as well as reinforced, by the metal strips 14 when dragged along rough supporting surfaces or subjected to blows during use.

It should be understood, of course, that the foregoing disclosure relates to only a preferred embodiment of the invention, and that it is intended to cover all changes and modifications of the example of the invention herein chosen for the purposes of the disclosure which do not constitute departures from the spirit and scope of the invention.

What is claimed is:

1. A container comprising an assembly of a top wall section, two opposed side wall sections, a bottom wall section and opposed end panels, each of said sections including a substantially rectangular body portion, a curved side edge along and substantially coextensive with one side of said body portion, and a curved lip along the other side of said body portion, the lip of each of said wall sections extending transversely of its body portion in the same general direction as the curved side edge of the section and having its ends terminating short of the ends of its wall section to form end flanges along each end of the body portion and its curved side edge, each of said wall sections having its curved side edge disposed in overlapping relationship with the curved lip of a contiguous section to provide a double thickness of material along the side edge joints of the container sections, each of said lips being inwardly offset relative to the body portion of its section to form a shoulder and the overlapping curved side edge of each section merging into coplanar alignment with the body portion of the contiguous section in abutting engagement with the shoulder thereof, said curved side edges and lips being cemented together to form leakproof side edge joints, and each of said end panels including a generally flat, rectangular wall portion, an outwardly bulged center portion, and an outwardly extending and continuous peripheral rim, said rim having curved corners with a radius of curvature substantially equal to the radius of curvature of said curved lips, said rim corners having inwardly and downwardly stepped outer side surfaces, the depth of the steps being substantially equal to the thickness of said lips and the circumferential length of the steps being substantially equal to the width of said lips, said end panels being nested within and against the flanges of the assembly of wall sections with the ends of the lips received adjacent said inwardly stepped surfaces, and metal binding strips wrapped around the edges of the rim of each end panel and the overlapping end flanges of said wall sections.

2. A container as claimed in claim 1 in which said wall sections and end panels are molded sheets of resin-impregnated and coated fiber mats.

3. A container comprising an assembly of a top wall section, two opposed side wall sections, a bottom wall section and opposed end panels, each of said wall sections including a substantially rectangular body portion, a curved side edge along and coextensive with one side of said body portion, and a curved lip along the other side of said body portion, the lip of each of said wall sections extending transversely of its body portion in the same direction as the curved side edge of the section and having its ends terminating short of the ends of its wall section to form end flanges along each end of the body portion and its curved side edge, each of said wall sections having its curved side edge disposed in overlapping relationship with the curved lip of a contiguous section to provide a double thickness of material along the side edge joints of the container sections, said curved side edges and lips being cemented together to form leakproof side edge joints, and each of said end panels including a generally flat, rectangular wall portion having an outwardly extending and continuous peripheral rim, said rim having curved corners with a radius of curvature substantially equal to the radius of curvature of said lips, and said rim corners having inwardly and downwardly stepped outer side surfaces, the depth of the steps being substantially equal to the thickness of said lips and the circumferential length of the steps being substantially equal to the width of said lips, said end panels being nested within the end flanges of the assembly of wall sections with the ends of the lips thereof received adjacent said inwardly stepped surfaces.

4. A container comprising an assembly of separate, preformed wall sections and opposed end panels, each of said wall sections including a body portion, a curved side edge along and coextensive with one side of said body portion, and a curved lip along the other side of said body portion, said side edge and said lip having constant radii of curvature with the radius of curvature of said lip being smaller than the radius of curvature of said side edge, each of said lips having its ends terminating short of the ends of its section to form end flanges along each end of the body portion and its curved side edge, each of said wall sections having its curved side edge disposed in overlapping relationship with the curved lip of a contiguous section to provide a double thickness of material along the side edge joints of the container sections, each of said lips being inwardly offset relative to the body portion of its section and the overlapping side edge of each wall section merging into coplanar alignment with the body portion of the contiguous section, and each of said end panels including an outwardly extending and continuous peripheral rim having curved corners, said rim corners having inwardly and downwardly stepped outer surfaces, the depth of said steps being substantially equal to the thickness of said lips and the circumferential length of said stepped surfaces being substantially equal to the width of said lips, said end panels being nested within the end flanges of the assembly of wall sections with the ends of said lips received adjacent said inwardly stepped surfaces.

5. A container comprising an assembly of a top wall section, two opposed side wall sections, a bottom wall section and opposed end panels, each of said wall sections including a body portion, a curved side edge along and coextensive with one side of said body portion, and a curved lip along the other side of said body portion, each of said wall sections having its curved side edge disposed in overlapping relationship with the curved lip of a contiguous section to provide a double thickness of material along the side edge joints of the container sections, each of said lips being inwardly offset relative to the body portion of its section and the overlapping side edge of each wall section merging into coplanar alignment with the body portion of the contiguous section, and each of said end panels including an outwardly extending and continuous peripheral rim having curved corners, said rim corners being recessed inwardly and downwardly, the depth of said recesses being substantially equal to the thickness of said lips and the circumferential length of said recesses being substantially equal to the width of said lips, said end panels being nested within said assembly of wall sections with the ends of said lips received in said recesses.

References Cited in the file of this patent

UNITED STATES PATENTS

| | | |
|---|---|---|
| 2,823,826 | Moore | Feb. 18, 1958 |
| 2,943,758 | Harris | July 5, 1960 |